United States Patent Office 2,792,297
Patented May 14, 1957

2,792,297
MANUFACTURE OF TREBLE SUPERPHOSPHATE

Albert C. Mohr, Orinda, Calif., assignor to Stauffer Chemical Company, a corporation of Delaware No Drawing. Application January 27, 1955,
Serial No. 484,587

1 Claim. (Cl. 71—41)

This invention relates to an improvement in the manufacture of treble superphosphate utilizing phosphoric acid and phosphate rock, and particularly to a process enabling treble superphosphate to be produced which contains an increased amount of phosphorus, e. g., 2% and more, measured as available $P_2O_5$ or the citrate soluble fraction as determined by the official A. O. A. C. method.

The usual practice in the manufacture of treble superphosphate includes digestion of phosphate rock with sulfuric acid to form phosphoric acid, and separation of the phosphoric acid from solids such as calcium sulfate by filtration. Depending on the process used, the phosphoric acid may or may not be concentrated. In any case, about two parts of the phosphoric acid are mixed with one part of phosphate rock, the parts being determined on a $P_2O_5$ weight basis. From this, it will be evident that the higher the concentration of total $P_2O_5$ in the phosphate rock which is treated with phosphoric acid, the higher will be the available $P_2O_5$ content of the finished treble superphosphate. The increase is usually as much as 2% and more in the final available $P_2O_5$ content.

It has been proposed heretofore to beneficiate phosphate rock utilizing various so-called wet methods of separation. I have found that by using a dry method of separation on certain phosphate rocks, particularly those derived from the Permian phosphate deposits of the Rocky Mountains, one can produce treble superphosphate containing an increased quantity of phosphorus as $P_2O_5$.

I have consistently produced treble superphosphate containing 46% and more $P_2O_5$ from rock from the Permian deposits whereas the highest $P_2O_5$ content attainable heretofore from rock from these same deposits was 42.0–43.5%.

Rocks in the Permian phosphate deposits consist of minute agglomerates of relatively high grade material surrounded by and carried in a matrix having a relatively low $P_2O_5$ content. A rock of this type is usually termed oolitic in structure, being made up of more or less globular particles of high $P_2O_5$ content consolidated with clay and other materials to make up the phosphate rock. I have determined that by subjecting such a material to a relatively mild comminution, followed by a separation, I am able to provide two classes of material, as measured by the $P_2O_5$ content: one of relatively low grade which can be utilized for the manufacture of phosphoric acid, and another of relatively high grade, which can be used for the production of treble superphosphate by acidification with phosphoric acid.

In practicing the invention, the phosphate rock is mined by any suitable means and is prepared, preferably by suitable dry methods, to provide a phosphate bearing rock for use in the process as will be described. The invention is not limited in this respect since the rock can be mined and prepared by any suitable means and methods known to those skilled in the art. The rock is then fed to a comminution device in which a minimum of reduction in size of the hard agglomerates is effected, while a maximum release is achieved of the agglomerates from the matrix of the softer binding materials. Either before or during this comminution it is beneficial to reduce the moisture content of the rock.

The resulting material is then subjected to mechanical separation and is divided into a fine fraction and a coarse fraction, the division usually being as between fine material and coarse material. The fine material is then passed into a sulfuric acid leaching system wherein the material is acidified to produce phosphoric acid, which is recovered. The coarse material will be found to have a $P_2O_5$ content of 34% and better. This material is then subjected to further grinding, following which it is acidulated with the previously produced phosphoric acid in the usual manner to produce treble superphosphate. I prefer that at least 90% and as much as 93% of the material pass a 100 mesh screen with at least 65% and as much as 70% passing a 200 mesh screen; all screen sizes given herein are based on the U. S. Standard Screen. It will be found that this material has a $P_2O_5$ content of at least 45%, and I have succeeded in producing material containing as much as 47.8% using the steps outlined.

*Example 1.*—To illustrate how the Permian deposit phosphate rock can be fractionated into a rich $P_2O_5$ fraction and a lean $P_2O_5$ fraction by reduction of the bonding between the phosphate oolites, a typical rock was ground in a small laboratory attrition mill and was then screened to separate various fractions. Each fraction was analyzed for its $P_2O_5$ content.

Table 1

| Mesh | −20 | −20 +28 | −28 +42 | −42 +60 | −60 +80 | −80 +100 | −100 +200 | −200 | Total |
|---|---|---|---|---|---|---|---|---|---|
| Percent Wt | 100 | 7.8 | 16.4 | 21.4 | 15.1 | 7.0 | 16.9 | 15.4 | 100.0 |
| Percent $P_2O_5$ | 32.6 | 35.2 | 34.9 | 34.6 | 33.7 | 32.9 | 31.7 | 24.6 | |

MATERIAL BALANCE

| | In | Out | | | | | | | |
|---|---|---|---|---|---|---|---|---|---|
| Grms. $P_2O_5$ | 32.6 | 2.75 | 5.72 | 7.40 | 5.09 | 2.30 | 5.36 | 3.79 | 32.41 |
| Percent of Total $P_2O_5$ | | 8.5 | 17.7 | 22.8 | 15.7 | 7.1 | 16.6 | 11.7 | |

From the above, it will be observed that of that material passing a 20 mesh screen and retained on a 60 mesh screen, 49.0% of the $P_2O_5$ content of the original material was contained in 45.6% of the material and the three fractions providing this contained a minimum of 34.6% $P_2O_5$, while the remaining fractions contained no more than 33.7% $P_2O_5$ and this in only one fraction.

Sufficient of the high grade rock fractions are reserved to supply the necessary quantity of rich rock for subsequent acidulation with phosphoric acid. The balance of the rock including the $P_2O_5$ lean fraction is acidified with sulfuric acid in known manner to provide phosphoric acid which is recovered and used to acidify the $P_2O_5$ rich fraction and provide a treble superphosphate containing 46% or more of $P_2O_5$.

*Example 2.*—To illustrate further the practice of this invention, a suitably prepared Permian deposit rock feed was ground in 66″ five roll air-swept Raymond mill. The ground product was separated into a coarse and a fine fraction, the coarse fraction was reground in a second Raymond mill, while the fine fraction was employed to produce phosphoric acid in known manner, which was thereafter used to acidulate the reground P₂O₅ rich reground coarse fraction to produce a treble superphosphate containing 46+% P₂O₅. The feed rates, P₂O₅ content, and sizes are given in Table II.

Table II

|  | Run No. 1 | Run No. 2 |
|---|---|---|
| 1. Feed to Mill: | | |
| Percent P₂O₅ | 31.7 | 31.5 |
| Tons per hour | 23 | 23 |
| Screen Size— | | |
| Percent +6 mesh | 9.8 | 0.1 |
| Percent −6 +20 | 2.0 | 1.0 |
| Percent −20 +80 | 37.9 | 43.5 |
| Percent −80 +100 | 11.2 | 12.7 |
| Percent −100 | 40.0 | 42.5 |
| 2. Feed to Mechanical Separator from the above Mill: | | |
| Screen Size— | | |
| Percent +60 | 4.5 | 3.8 |
| Percent −60 +80 | 6.0 | 6.0 |
| Percent −80 +100 | 5.5 | 7.0 |
| Percent −100 +200 | 28.5 | 28.0 |
| Percent −200 | 55.5 | 55.2 |
| 3. Coarse fraction from Mechanical Separator: | | |
| Percent P₂O₅ | 34.2 | 34.4 |
| Tons per hour | 9 | 9 |
| Screen Size— | | |
| Percent +20 mesh | 0.1 | 0.1 |
| Percent −20 +60 | 6.9 | 6.3 |
| Percent −60 +80 | 8.8 | 8.5 |
| Percent −80 +100 | 10.0 | 10.2 |
| Percent −100 +200 | 51.7 | 49.1 |
| Percent −200 | 22.5 | 25.8 |
| 4. Fine Fraction from Separator: | | |
| Percent P₂O₅ | 28.6 | 28.6 |
| Tons per hour | 14 | 14 |
| Screen size— | | |
| Percent +100 mesh | 0.1 | 0.2 |
| Percent −100 +200 | 6.2 | 7.0 |
| Percent −200 | 93.7 | 92.8 |

As another feed, a 50–50 mix of a ¾" crude crushed Permian deposit rock and a material corresponding to the coarse fraction was subjected to the procedure of Example 2, the details being given in Table III. When acidulated with phosphoric acid provided from the "fine fraction," the "coarse fraction" produced a treble superphosphate containing more than 46% P₂O₅.

Table III

|  | Run 3 | Run 4 |
|---|---|---|
| 1. Feed to Mill: | | |
| Percent P₂O₅ | 30.0 | 30.1 |
| Percent Fe₂O₃ | 1.17 | 1.18 |
| Percent Al₂O₃ | 1.66 | 1.80 |
| Percent R₂O₃ | 2.83 | 2.98 |
| Tons per hour | 20.5 | 20.5 |
| Screen size— | | |
| +6 mesh | 26.6 | 26.3 |
| −6 +20 | 7.1 | 7.3 |
| −20 +80 | 31.5 | 28.5 |
| −80 +100 | 8.0 | 7.5 |
| −100 | 26.5 | 29.8 |
| 2. Feed to Mechanical Separator from above Mill: | | |
| Screen size— | | |
| +60 | 7.0 | 7.7 |
| −60 +80 | 6.0 | 5.8 |
| −80 +100 | 5.7 | 6.2 |
| −100 +200 | 26.5 | 24.5 |
| −200 | 54.8 | 55.8 |
| 3. Coarse Fraction from Separator: | | |
| Percent P₂O₅ | 34.1 | 34.0 |
| Percent Fe₂O₃ | 0.89 | 0.86 |
| Percent Al₂O₃ | 0.75 | 0.90 |
| Percent R₂O₃ | 1.64 | 1.76 |
| Tons per hour | 7.3 | 7.3 |
| Screen size— | | |
| +20 mesh | 0.3 | 0.2 |
| −20 +60 | 10.0 | 9.5 |
| −60 +80 | 8.8 | 8.7 |
| −80 +100 | 9.8 | 9.3 |
| −100 +200 | 45.8 | 45.0 |
| −200 | 25.3 | 27.3 |
| 4. Fine Fraction from Separator: | | |
| Percent P₂O₅ | 27.7 | 27.6 |
| Percent Fe₂O₃ | 1.30 | 1.30 |
| Percent Al₂O₃ | 2.31 | 2.31 |
| Percent R₂O₃ | 3.61 | 3.61 |
| Tons per hour | 13.2 | 13.2 |
| Screen size— | | |
| +100 | 0.4 | 0.4 |
| −100 +200 | 6.0 | 6.5 |
| −200 | 93.6 | 13.1 |

Various types of mills can be used in this process, making products that can be relatively coarse or, if desired, relatively finely pulverized. However, in any case, in effecting the first size reduction, the operation is so conducted that the matrix fraction is reduced in size to a maximum degree while the richer oolitic and harder phosphate rock content is reduced in size to a minimum, the two fractions then being separated. By operating in this manner, one can achieve a substantial increase in the P₂O₅ content of a superphosphate upon acidulation after further separate grinding of the coarse oolitic phosphate rock content.

The process is not limited to the P₂O₅ content of the starting material since its advantage lies in enabling the availavle P₂O₅ content of the final product to be increased by 2% and more over that otherwise attainable by methods known heretofore.

I claim:

In a process for manufacture of treble superphosphate from a phosphate rock and in which process sulfates present are converted to phosphates by treatment with phosphoric acid, the phosphoric acid being derived by acidulation with sulfuric acid of one portion of the phosphate rock to form phosphoric acid which is recovered as such and thereafter applied to another portion of the phosphate rock, the improvement which consists in subjecting Permian deposit phosphate rock composed of phosphate-rich oolites and a softer phosphate-poor matrix to a mechanical disintegration treatment whereby the matrix is reduced to a finely divided particle size while the oolites are reduced to a coarser particle size than said matrix particles, separating the fine matrix particles from the coarser oolite particles, treating the fine matrix particles with sulphuric acid to produce phosphoric acid, comminuting the coarse oolite particles, and treating the thus comminuted oolite particles with said phosphoric acid to form treble superphosphate having an increased P₂O₅ content of at least 46%.

References Cited in the file of this patent

UNITED STATES PATENTS

| 24,931 | Genth | Aug. 2, 1859 |
| 389,566 | Glaser | Sept. 18, 1888 |
| 1,083,429 | Brunschwig | Jan. 6, 1914 |
| 1,351,672 | Meigs | Aug. 31, 1920 |
| 1,837,285 | Ober et al. | Dec. 22, 1931 |
| 1,880,544 | Waggaman | Oct. 4, 1932 |
| 2,015,384 | Nordengren | Sept. 24, 1935 |
| 2,106,223 | Nordengren | Jan. 25, 1938 |

OTHER REFERENCES

Industrial and Engineering Chemistry, Factors Affecting the Phosphoric Acid-Phosphate Rock Reaction, Marshall et al., vol. 25, No. 11, November 1935, pages 1253–1259.

Industrial and Engineering Chemistry, Superphosphate Manufacture, Mixing Phosphate Rock with Concentrated Phosphoric Acid, Copson et al., vol. 28, No. 8, August 1936, pages 923–927.